United States Patent
Vellaikal et al.

(10) Patent No.: US 8,924,147 B2
(45) Date of Patent: Dec. 30, 2014

(54) METHOD FOR CONSTRUCTING GEO-FENCES FOR A SPATIAL RECOMMENDATION AND DISCOVERY SYSTEM

(75) Inventors: Asha Vellaikal, San Francisco, CA (US); Anant Akinchan, Fremont, CA (US); Chai Geller, San Francisco, CA (US)

(73) Assignee: France Telecom, Paris (FR)

( * ) Notice: Subject to any disclaimer, the term of this patent is extended or adjusted under 35 U.S.C. 154(b) by 364 days.

(21) Appl. No.: 13/538,277

(22) Filed: Jun. 29, 2012

(65) Prior Publication Data

US 2013/0006522 A1 Jan. 3, 2013

Related U.S. Application Data

(60) Provisional application No. 61/503,387, filed on Jun. 30, 2011.

(51) Int. Cl.
| | |
|---|---|
| *G01C 21/00* | (2006.01) |
| *G06Q 30/02* | (2012.01) |
| *H04W 4/02* | (2009.01) |

(52) U.S. Cl.
CPC ........... *G06Q 30/0266* (2013.01); *H04W 4/021* (2013.01); *H04W 4/023* (2013.01)
USPC ............ 701/426; 701/400; 701/516; 701/410

(58) Field of Classification Search
USPC .............................................. 701/1, 400–541
See application file for complete search history.

(56) References Cited

U.S. PATENT DOCUMENTS

| | | |
|---|---|---|
| 6,452,498 B2 | 9/2002 | Stewart |
| 2010/0088179 A1 | 4/2010 | Desai et al. |
| 2011/0040626 A1 | 2/2011 | Lin |
| 2011/0148634 A1 | 6/2011 | Putz |
| 2011/0153143 A1 | 6/2011 | O'Neil et al. |

FOREIGN PATENT DOCUMENTS

| | | |
|---|---|---|
| WO | 2010036525 A2 | 4/2010 |
| WO | 2011037769 A1 | 3/2011 |

OTHER PUBLICATIONS

European Search Report and Written Opinion for European Patent Application No. EP 12 30 5763, dated Sep. 27, 2012.
Geo-Fence, Wikipedia: The Free Encyclopedia, Dec. 26, 2012, http://en.wikipedia.org/wiki/Geofence. Retrieved Jan. 10, 2013.

*Primary Examiner* — Bhavesh V Amin
(74) *Attorney, Agent, or Firm* — David D. Brush; Westman, Champlin & Koehler, P.A.

(57) ABSTRACT

A system, method, device, computer program, user interface, and apparatus to associate an object of interest of a map in a location database with a geo-fence. The method includes selecting a first time interval; selecting a mode of transportation; determining terrestrial routes starting from the object of interest; for each determined terrestrial route, determining an end point that can be reach on the terrestrial route within the first time interval using the selected mode of transportation; and storing a geo-fence for the first time interval and mode of transportation in associating with the determined end points.

17 Claims, 7 Drawing Sheets

US 8,924,147 B2

METHOD FOR CONSTRUCTING GEO-FENCES FOR A SPATIAL RECOMMENDATION AND DISCOVERY SYSTEM

CROSS-REFERENCE TO RELATED APPLICATIONS

The present application is based on and claims the benefit of U.S. provisional patent application Ser. No. 61/503,387, filed Jun. 30, 2011, the content of which is hereby incorporated by reference in its entirety.

FIELD OF THE PRESENT SYSTEM

The present system relates to at least one of a system, method, device, computer program, user interface, and apparatus for recommending content to a user device.

BACKGROUND OF THE PRESENT SYSTEM

Tracking a moving object in real time is quite easy these days thanks to available GPS chips on location enabled UEs such as mobile stations. Similarly, finding how long it would take for a moving object to reach a certain place at any given point is also possible if the terrestrial route data between the source and destination is available. However, accurately finding which all places of interest is reachable within a given time period is somewhat computationally intensive task. The complexity of this problem grows dramatically as the number of objects to be tracked and their area of movement grows. Accurately tracking millions of user equipments with limited resources in real time against millions of points of interest is still a big technical challenge.

Geo-fences technology solves this problem to a great extent (see for instance http://en.wikipedia.org/wiki/Geofence). It allows a location service to define a virtual fence around a target region or POI, and to raise an alert whenever a tracked object of interest, e.g. a MS, crosses it. The biggest limitation of this technology is that it uses the aerial distance between the tracked object and the fenced region instead of the distances along the actual terrestrial routes. In local context, usually the aerial distance between two geographic locations is not an accurate indicator of the travel time between them. There are several reasons for such limitations:

freeways are one way and have limited exits and entry points, some streets can be one way, some areas are bounded and have only a few entry/exit points, some areas have rail road, canals etc running through them.

For example, in order to figure out which POIs are within walking distance of a user, it is not sufficient to know just the user's location. It is important to know the actual route data between the POI and the user. In this scenario the current geo-fences implementations will end up providing inaccurate results in most of the cases.

Today there is still a need for an improved geo-fence that addresses the limitations of the known circular geo-fences. There is a further need for a computationally simple solution that can be used with location services.

SUMMARY OF THE PRESENT SYSTEM

It is an exemplary object of the present system to overcome disadvantages and/or make improvements in the prior art.

According to an aspect of the present system there is disclosed a recommendation method to associate an object of interest in a location database with a geo-fence, said method comprising:

a) selecting a first time interval;
b) selecting a mode of transportation;
c) determining terrestrial routes starting from the object of interest placed on a map;
d) for each determined terrestrial route, determining an end point that can be reach on said terrestrial route within the first time interval using the selected mode of transportation;
e) storing a geo-fence for the first time interval and mode of transportation in associating with the determined end points.

Thanks to the present method and system, the location database is built for a plurality of objects of interest, each object of interest being associated for a preset number of time intervals and various modes of transportation to a geo-fence which perimeter is defined by end points that can be reached for a given mode of transportation within one of the time intervals on terrestrial routes starting from the object of interest.

When used with a location service, as the one described in the present document, actual distances, and not aerial distances, can be used to determine reachability of an object of interest.

According to another aspect of the present system there is disclosed a location server to associate an object of interest in a location database with a geo-fence, location server being arranged to:

a) select a first time interval;
b) select a mode of transportation;
c) determine terrestrial routes starting from the object of interest placed on a map;
d) for each determined terrestrial route, determine an end point that can be reach on said terrestrial route within the first time interval using the selected mode of transportation;
e) store a geo-fence for the first time interval and mode of transportation in associating with the determined end points.

According to another aspect of the present system there is disclosed a computer program stored on a computer readable non-transitory memory medium, the computer program configured to associate an object of interest in a location database with a geo-fence, the computer program comprising instructions to:

a) select a first time interval;
b) select a mode of transportation;
c) determine terrestrial routes starting from the object of interest placed on a map;
d) for each determined terrestrial route, determine an end point that can be reach on said terrestrial route within the first time interval using the selected mode of transportation;
e) store a geo-fence for the first time interval and mode of transportation in associating with the determined end points.

In accordance with another aspect of the present system, the present system may include:

a location database;
a location server to associate an object of interest in a location database with a geo-fence, location server being arranged to:

a) select a first time interval;
b) select a mode of transportation;
c) determine terrestrial routes starting from the object of interest placed on a map;
d) for each determined terrestrial route, determine an end point that can be reach on said terrestrial route within the first time interval using the selected mode of transportation;

e) store a geo-fence for the first time interval and mode of transportation in associating with the determined end points.

BRIEF DESCRIPTION OF THE DRAWINGS

The invention is explained in further detail, and by way of example, with reference to the accompanying drawings wherein.

DETAILED DESCRIPTION OF THE PRESENT SYSTEM

Figure 1:
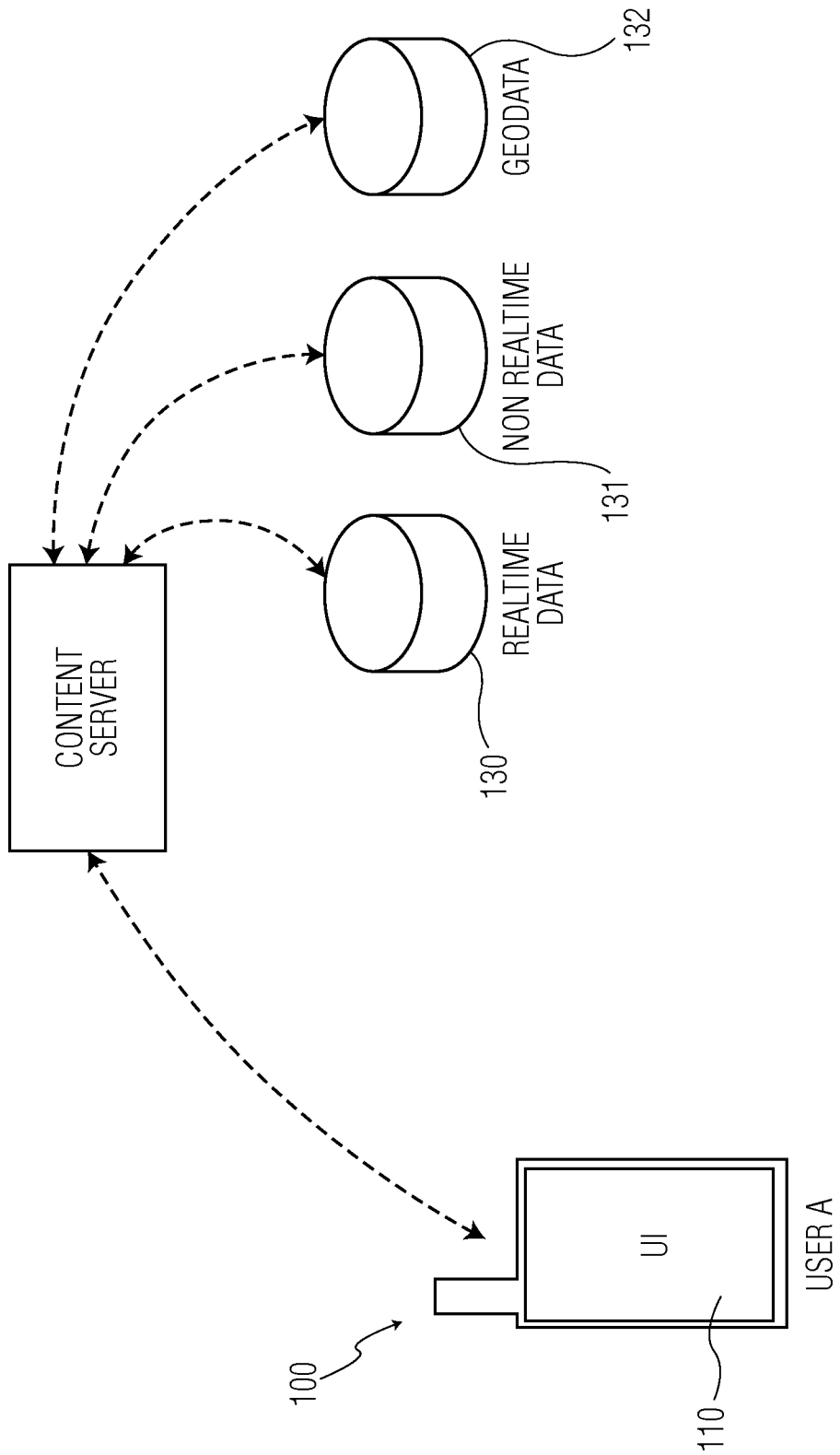
FIG. 1 shows an exemplary system in accordance with a first embodiment of the present system.

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well known devices, circuits, tools, techniques and methods are omitted so as not to obscure the description of the present system. It should be expressly understood that the drawings are included for illustrative purposes and do not represent the scope of the present system. In the accompanying drawings, like reference numbers in different drawings may designate similar elements.

For purposes of simplifying a description of the present system, the terms "operatively coupled", "coupled" and formatives thereof as utilized herein refer to a connection between devices and/or portions thereof that enables operation in accordance with the present system. For example, an operative coupling may include one or more of a wired connection and/or a wireless connection between two or more devices that enables a one and/or two-way communication path between the devices and/or portions thereof. For example, an operative coupling may include a wired and/or wireless coupling to enable communication between a content or recommendation server and one or more user devices. A further operative coupling, in accordance with the present system may include one or more couplings between content sources and the content server, such as via different network entities, such as the communication nodes and other servers, in accordance with an embodiment of the present system.

The term rendering and formatives thereof as utilized herein refer to providing content, such as digital media or web pages which may include, for example, data such as ads, notifications, etc., such that it may be perceived by at least one user sense, such as a sense of sight and/or a sense of hearing. For example, the present system may render a user interface on a display device of a user equipment (UE) so that it may be seen and interacted with by a user. Further, the present system may render audio visual content on both of a device that renders audible output (e.g., a speaker, such as a loudspeaker) and a device that renders visual output (e.g., a display). To simplify the following discussion, the term content and formatives thereof will be utilized and should be understood to include audio content, visual content, audio visual content, textual content and/or other content types, unless a particular content type is specifically intended, as may be readily appreciated.

The system, device(s), method, user interface, etc., described herein address problems in prior art systems. In accordance with an embodiment of the present system, a system, method, device, computer program, and interface for rendering a UI for a users convenience is disclosed. The UI may include one or more applications which are necessary to complete an assigned task.

The user interaction with and manipulation of the computer environment is achieved using any of a variety of types of human-processor interface devices that are operationally coupled to the processor controlling the displayed environment. A common interface device for a user interface (UI), such as a graphical user interface (GUI) is a mouse, trackball, keyboard, touch-sensitive display, etc. For example, a mouse may be moved by a user in a planar workspace to move a visual object, such as a cursor, depicted on a two-dimensional display surface in a direct mapping between the position of the user manipulation and the depicted position of the cursor. This is typically known as position control, where the motion of the depicted object directly correlates to motion of the user manipulation.

An example of such a GUI in accordance with an embodiment of the present system is a GUI that may be provided by a computer program that may be user invoked, such as to enable a user to view and/or to select rendered content. Accordingly, the GUI may present a typical UI including a windowing environment and as such, may include menu items, pull-down menu items, pop-up windows, etc., that are typical of those provided in a windowing environment, such as may be represented within a Windows™ Operating System GUI as provided by Microsoft Corporation and/or an OS X™ Operating System (OS) GUI, such as provided on an iPhone™, MacBook™, iMac™, etc., as provided by Apple, Inc., and/or another operating system. Other operating systems such as Android™ or IOS (iPhone™ OS) for mobile stations may be used as well. The objects and sections of the GUI may be navigated utilizing a user input is device, such as a mouse, trackball, finger, and/or other suitable user input. Further, the user input may be utilized for making selections within the GUI such as by selection of menu items, window items, radio buttons, pop-up windows, for example, in response to a mouse-over operation, and other common interaction paradigms as understood by a person of ordinary skill in the art.

Similar interfaces may be provided by a device having a touch sensitive screen that is operated on by an input device such as a finger of a user or other input device such as a stylus. In this environment, a cursor may or may not be provided since location of selection is directly determined by the location of interaction with the touch sensitive screen. Although the GUI utilized for supporting touch sensitive inputs may be somewhat different than a GUI that is utilized for supporting, for example, a computer mouse input, however, for purposes of the present system, the operation is similar. Accordingly, for purposes of simplifying the foregoing description, the interaction discussed is intended to apply to either of these systems or others that may be suitably applied.

The present system may identify content or points of interest (POIs) to serve highly targeted notification information (e.g., render notification information within a UI of a user equipment) such as, for example, addresses and description of businesses, places, monuments, events . . . that answers the user expressed intent. Accordingly, notification information such as, for example, advertisements, may be offered and/or rendered on the UE during the time window, if any, provided by the user. Further, the present system may select the notification information about POIs, also referred to alerts here after, in accordance with a user's profile.

FIG. 1 shows an exemplary embodiment of the present system. A user equipment 100, illustrated here as a mobile station (MS) or device, sends an intent provided by a user of the UE 100 to a content or recommendation server 110 enabling the location service according to the present system. The intent may be provided by the user through a GUI provided by the recommendation server 110. Alternatively, the UE 100 may be provided with an application or app in short, for connection to the content server 110. In both instance, a GUI for the location service is provided to the user.

In order to recommend POIs matching the provided user intent, content server may be operatively connected to various sources of content data 130, 131 and 132. Content source 130 may comprise real time content data sources, like Four Square™ check-ins (i.e. popular places), and any information that may influence time of travel on roads, such as traffic, weather, accidents, constructions . . . it may also comprise real time data such as attendance to a show to inform the user that he may not be able to see the movie initially proposed by the content server 110.

Content source 131 may comprise non real time content data such as deals, offers, coupons offered at a given moment, weather forecast for a day, traffic forecast based on expected road constructions and closures, complementary information on events or touristic attractions (from sources like Wikipedia™).

Additional geo-data sources 132 may be operatively connected to the content server 110. Such sources comprise e.g. geographical information about any POIs present in a region. Such data may come from instant from business directories, yellow or white pages or websites such as Yelp™. Mapping data may be provided with the geo-data sources 132 in order to access road information. Such mapping data is for instance used in known geolocation services such as Google!Maps™ or MapQuest™. These mapping data may comprise also average speeds along each described portions of roads for different types or modes of transportation, such as cars, trucks, buses, bicycles, pedestrians, motorcycles . . . . These average speeds are also used today for instance by Google!Maps™ to estimate duration of transportation from one point to another on a map.

Figure 2:
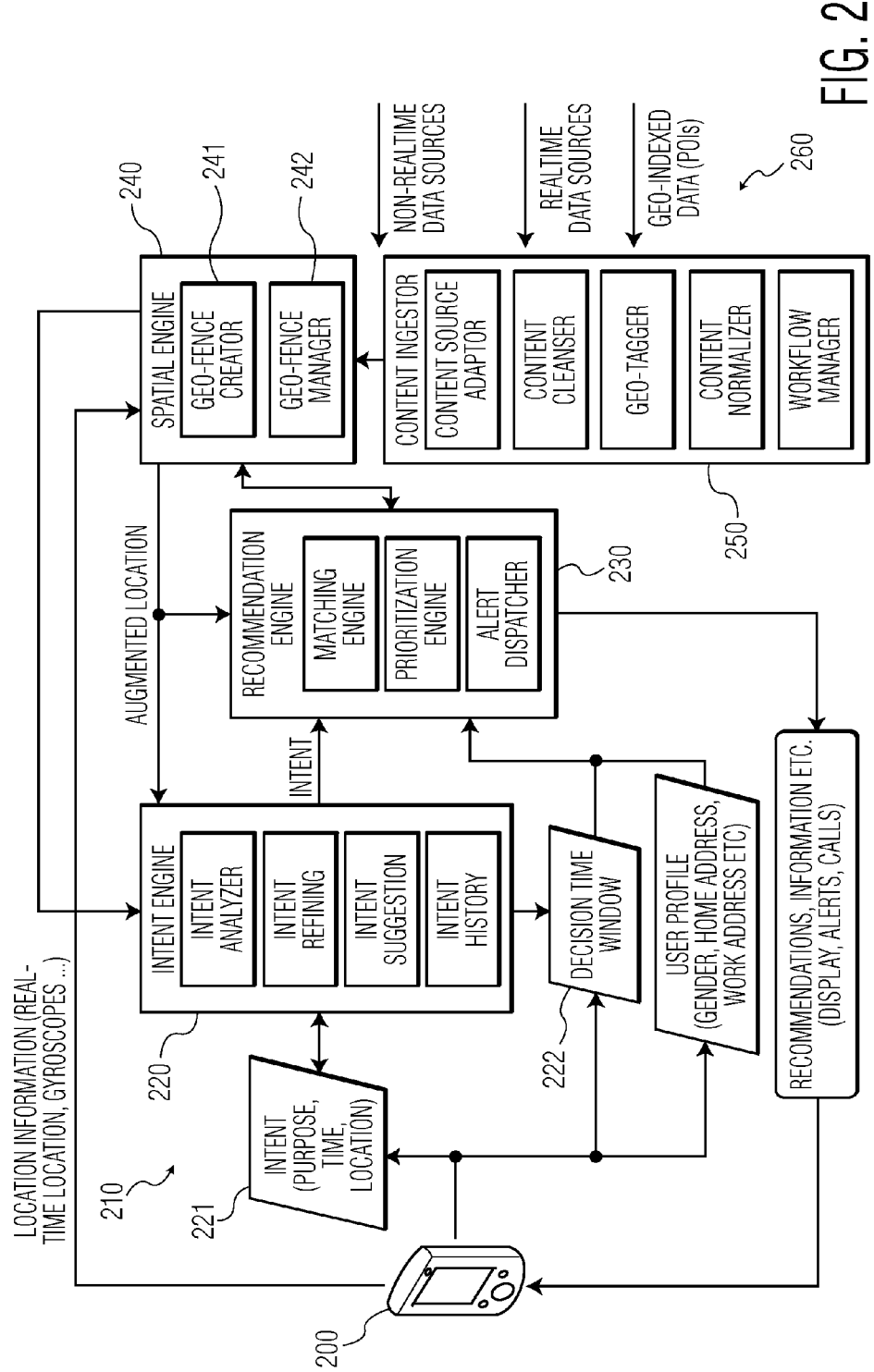
FIG. 2 shows another exemplary system in accordance with a second embodiment of the present system.

Another exemplary embodiment of the present system is illustrated in FIG. 2. Location enabled user equipment 200 is operatively connected to the recommendation or content server 210, itself connected to sources 260. Content server 210 comprises different parts in charge of different functions enabled by this server, namely an intent engine part (or intent engine in short) 220, a recommendation engine 230, a spatial engine 240 and a content ingestor engine 250. Each of these engines are themselves divided in subparts as illustrated here after.

In the present system, one may note that illustrating the content server 210 as made of separate parts and subparts is just for clarity purposes and illustration of its different functions. This is in no way limiting as these parts and subparts could be hosted by multiple nodes forming together the content server. Alternatively all parts may be subroutines or modules from a same computer program running on a content server.

The present location service hosted by the content server 210 may take into account the following inputs:
  intent 221 expressed by the user,
  a time window 222 of validity of the intent,
  location information received from the UE 200.

In the present system, the user is expressing an intent through an input or a request placed with his UE 200. The intent may be expressed through an input such as words provided to an input box on a GUI mentioned in relation to FIG. 1. Alternatively, the intent may be provided by selecting different options and menus provided on the location service GUI.

Thus, intent input can occur by various ways:
  selection from a pre-populated set of inputs. For example, the user can select from a list of categories like "Breakfast, Lunch, Dinner" etc. The user can also browse through a bigger set of events, as listed in Appendix 1,
  user can input a query into a field or box of the location service GUI—"I want a latte now" or just simply "Latte now".

The intent may be seen as a user request for a category of POIs or activity. The request may be more or less complex with additional information such as time window and/or final destination. In the present system, intent may encompass a variety of actions and experiences a user is interested in. An NLP (Natural Language Processing) engine or intent analyzer (as illustrated in FIG. 2 in relation to the intent engine 220) is provided to interpret the intent input received from the user, separate intent from other information (destination/time window . . . ) and infer one or more categories this intent is associated with. The intent analyzer may even rely upon an intent refining engine and come back to the user with a series of suggestions to help refine the intent. Intent refinement may be seen as an interactive way to help the user narrow down his request based on his preferences.

Intent refining engine may take various inputs to make its calculations, such as the intent itself, or the time window or location information gathered from the UE 200:

Example 1

By understanding the intent, the system can help the user refine his query. The user may have selected Lunch. The system can help refine the intent by offering suggestions based on cuisine. See Appendix 1 for different categories of cuisine Example 2

The user may have selected family movies. The system can come back with all movies with R rating playing in nearby theatres for the next show.

Example 3

The user does not have a clear intent in mind. The system can start making contextual suggestions based on popularity, events around him/her etc.

Examples of intent categories are listed in Appendix 1 of the present application. Specific intent examples are listed here after:

Very specific intents with qualifiers:
1. Food (breakfast/lunch/dinner/dessert/snack), coffee
2. Type of restaurant (easy/casual, romantic, good for big party, kid-friendly, cheap, expensive, Open Now, Takes Reservations, good for groups).
3. Restaurant by types of cuisine (Japanese, French, Indian)
4. Nightlife (Bars, Live Music, Jazz club)
5. Movies (Family, comedy, drama)
6. Activities (Hiking, Bowling, Rock Climbing, Beaches)

Experiential intent:
1. Somewhere happening
2. Somewhere quiet
3. Somewhere relaxing Intent with monetary value:
1. Lunch for around $10
2. Dinner for 3 around $150
3. Someplace with deals currently Intent to discover the city/what is around me:
1. Interesting nearby—monuments, exhibits, street art, Heritage locations
2. Interesting things to do in the immediate vicinity.

Intent indicating who I am with (qualifier):
1. Alone
2. With spouse
3. With kids
4. With 2 friends
5. With a big group Intent comprising a specific type of food/experience:
1. I want to have some good Risotto
2. I want to hear a good local band.

Intents chained together to form a set of intents:
1. Bar hopping in the Union square area.
2. Movie followed by dinner followed by a bar.

Intents related to social activity:
1. I want to meet up with friends
2. I want to attend a concert Intents can be related to events nearby or in a location:
1. Find me a place to watch fireworks.
2. Find me a happening place nearby to watch the soccer game. 1. Find me a place to watch fireworks.
3. Find me a happening place nearby to watch the soccer game.

An intent suggestion engine may also be provided with the intent engine 220 to suggest intents prior to any user's request to help the user. For example, the intent suggestion engine may offer suggestions to the user based on time of day, location information and/or interesting happenings, events as known from the data sources operatively connected to the content ingestor engine. Examples could be:

1. time of Day: it is the evening and the intent suggestion engine may recommend dinner over lunch/breakfast if the user provides an intent such as "eating", 2. location information: the user is close to the SF Giants stadium and the intent suggestion engine offers coupons for tickets to the next game, especially is history of intents shows interest in sport events.

Indeed, intent refining and suggestion engines may rely upon an intent history database provided with the intent engine as illustrated in FIG. 2.

A decision time window 222, or time window in short, is also used by the recommendation server 210 of the present system. The decision time window 222 corresponds to the validity period for the intent. The time window 222 may be explicitly provided by the user. Alternatively, it may be omitted but implicit from the intent 221 expressed by the user. Indeed, the intent engine may be provided with default time windows for each identifiable category. Thus, provided the recommendation engine 230 does not receive a decision time window 222 from the UE 200, it may gather a default time window from the intent engine 220, operable to associate the intent with a default validity period for the intent.

The decision time window 222 may be seen as the duration or period of time when the user of UE 200 is willing to accept responses from the recommendation server 210. Decision time window 222, as explained later on, helps the location service to determine the extent of travelling the UE 200 may do to reach a candidate POI considering the mode of transportation inferred from the location information.

UEs such as mobile stations or devices have the ability today to determine location information such as their position at a specific time. Location information may also be further enhanced using gyroscopes to infer elevation and orientation. As measured over time, speed and directions can be calculated from the temporal location information. From the range of speed, spatial engine, as explained later on, can infer a mode of transportation, i.e. determine whether the user is travelling with his UE on foot, on a bicycle, motorcycle or car (for instance using gyroscope reading motions typical to a motorcycle for speeds similar to a car), a bus, a train or else.

As further detailed in relation to FIG. 5, location information may be further enhanced by adding further location context information to form an augmented location in order to predict a trajectory and timing of movement for the UE. For instance context information could be found in the expressed intent from the user when his input intent is "I am heading south to San Jose for lunch". The prediction of future movement could produce multiple itineraries/destinations associated with their own probability and confidence score. With an intent provided with a location context or location element, as in the here above example, any itineraries heading away from San Jose would be discarded. The prediction will also be updated and change as the user continues to move or as new inputs are received (for example change in speed of travel caused with a change of mode of transportation). The augmented location as showed later on may comprise speed of UE, direction of travel, mode of transportation . . . .

As explained in relation to FIG. 1, various content data sources 260 are fed to the recommendation server 210, namely to the content ingestor engine 250, so that such data can be analyzed and prepared for the spatial and recommendation engines 240 and 230 respectively.

Data sources 260, real-time, non real-time or else, may fall in either POIs data or mapping data. As itineraries, roads . . . are needed for the present location service, a first category of data is needed for geographical mapping. These data are similar to data for any mapping services such as Goo-gle!Maps™ or MapQuest™). Beyond static data such as maps, such data may include real-time data such as road conditions, closed roads, accidents, constructions, traffic, up-to-date average speed per mode of transportation . . . . Average speed may also be provided as non real-time data, such as e.g. average speed for a given mode of transportation at rush hour and outside rush hours.

A second category of data is related to the POIs themselves, i.e. any events, businesses, monuments . . . this info may be found from sources such as business directories, yellow/white pages, Yelp™ . . . . These entries are already available today as the existing mapping services enable today searches for businesses or events. Data for each POI could be static (location, opening hours) or real-time (promotions, shorter opening hours due to special occasions, sales . . . ).

Different techniques to handle and ingest the different sources of data are readily available to the man skilled in the art and are beyond the teachings of the present application. An exemplary illustration of the content ingestor engine 250 is presented as follows.

Content ingestor engine 250 may comes into play every time a new content data is ingested into the present system, e.g. each time a new POI becomes available, new road is added, or traffic conditions on a given highway are changed due to heavy rains or an accident. Engine 250 is responsible for preparing new content such that:

the spatial engine 240 can access them efficiently (for the construction and triggering of the geo-fences as explained later on); and, the recommendation engine 230 can perform the matching and filtering of the POIs to present to the UE 200.

The system can find new content either when a new content source is identified or updates are received from old sources. Some of the content sources may produce stream of real time data, while some have non-real time, mostly static data as mentioned before. The data ingestion workflow may depend on the kind of data and the source ingested. As illustrated with FIG. 2, content ingestor engine 250 may comprise:

a content source adaptor: a new source of content can be added to the present system using a custom source adaptor. This module is aware of all source specific configuration parameters. It knows how to access the content, frequency of updates, nature of updates, volume of updates, overall data volume, expected data life span, categorization of data . . . . Mapping information may also be processed through the content normalizer in order to have it match existing formats for already stored mapping data, content cleanser: its primary task is to cleanse the content and separate the noise from information. Users' comments may be cleaned out depending on how they are relevant to the present location service. The cleansing may be based on filters set by the administrator of the location service. Once it has extracted clean information, it restructures it as per system defined format depending on the type of content, geo tagger: for all content for which the source does not provide location tags, this module tries to assign one. To do that it may use various information analysis methods like natural language processing to identify the referred places, by extracting the location information from content's meta-data, by cross referencing other such public databases etc. The structured content is inserted into the content database and shared with the spatial engine 240 and recommendation engine 230 for subsequent use. These tags may for instance be used in the matching of the POIs with the intent from the user.

content normalizer: for any given POI, information can be retrieved from various independent sources. Since information sources are independent, ensuring uniqueness of POIs and uniqueness of information may prove useful to avoid duplicates. This module is responsible for both these tasks. It tries to associate new content with an existing POI in the system using various NLP based methods. If that fails then it creates a new POI for the content. Whenever the content normalizer comes across a conflict, it uses the preconfigured set of rules to decide the parent POI and may alert the location service administrator about it. Updates from old sources will lead to new versions of old information. It ensures that old information is correctly identified and over written. To do that it may employ information versioning and pre-configured conflict resolution rules, workflow manager: different data content will require different workflow tasks. This module helps create the ingestion workflow and run them. For real time data sources it runs these as non-stop jobs and for non-real time data sources, its schedules the workflow job pre-configured intervals depending on the rate of data updates and data volume.

The content ingestor engine 250 may store the processed data from the content sources in a spatial or location database (not shown in FIG. 2) managed by the spatial engine 240. Handling of location information, calculation of speed, mode of transportation, direction of travel of the UE, in other words, the augmented location, will also be handled by the spatial engine 240.

In the present system, once the recommendation server 210 has gathered the intent 221 from the user, the time window 222, and the location information, it will infer using the spatial engine 240 a mode of transportation based on the location information. In order to propose candidate POIs to the user, i.e. POIs that match his expressed intent 221, the recommendation engine 230 will rely upon the spatial engine 240 to determine POIs that are within reach of the UE over the time window 222. In other words, for the duration of the time window, the spatial engine will determine the POIs that are within reach of the UE 200 based on the time left of the time window and the determined mode of transportation. Different techniques are known to determine an area of reach around an object or point of interest. This may be for instance enabled through the use of geo-fences as explained here after. Thus spatial engine 240 may comprise:

a geo-fence creator engine 241 or geo-fence creator in short, to built geo-fences around POIs or the UE, a geo-fence manager 242 to determine the POIs within reach of the UE, to be provided to the recommendation engine 230 for subsequent filtering.

In an additional embodiment of the present system, to manage operation and maintenance of the spatial or location database, the spatial engine 240 may create and store therein geo-fences around all POIs stored in the database, define corresponding geo-alert rules (when a moving object crosses a geo-fence) and watch for triggering of the geo-alert rules. In other words, the spatial engine 240 stores the route data around any stored POIs, location of the POIs as well as the location information for monitored UE 200. It may stores complete location trails during the course of journey of the UE 200. The trails of past journeys may be archived for analytical purposes.

In an additional embodiment of the present system, geo-fences taking into account actual routes around a POI, or the UE itself, are built by the spatial engine 240 and stored in the location database. This helps define true boundaries of a geo-fence beyond aerial distances which are can poorly describe the actual proximity of a POI. Such geo-fences, later on referred to as polygonal geo-fences due to their shape, may be used for any object of interest positioned on a map.

Figure 3A:
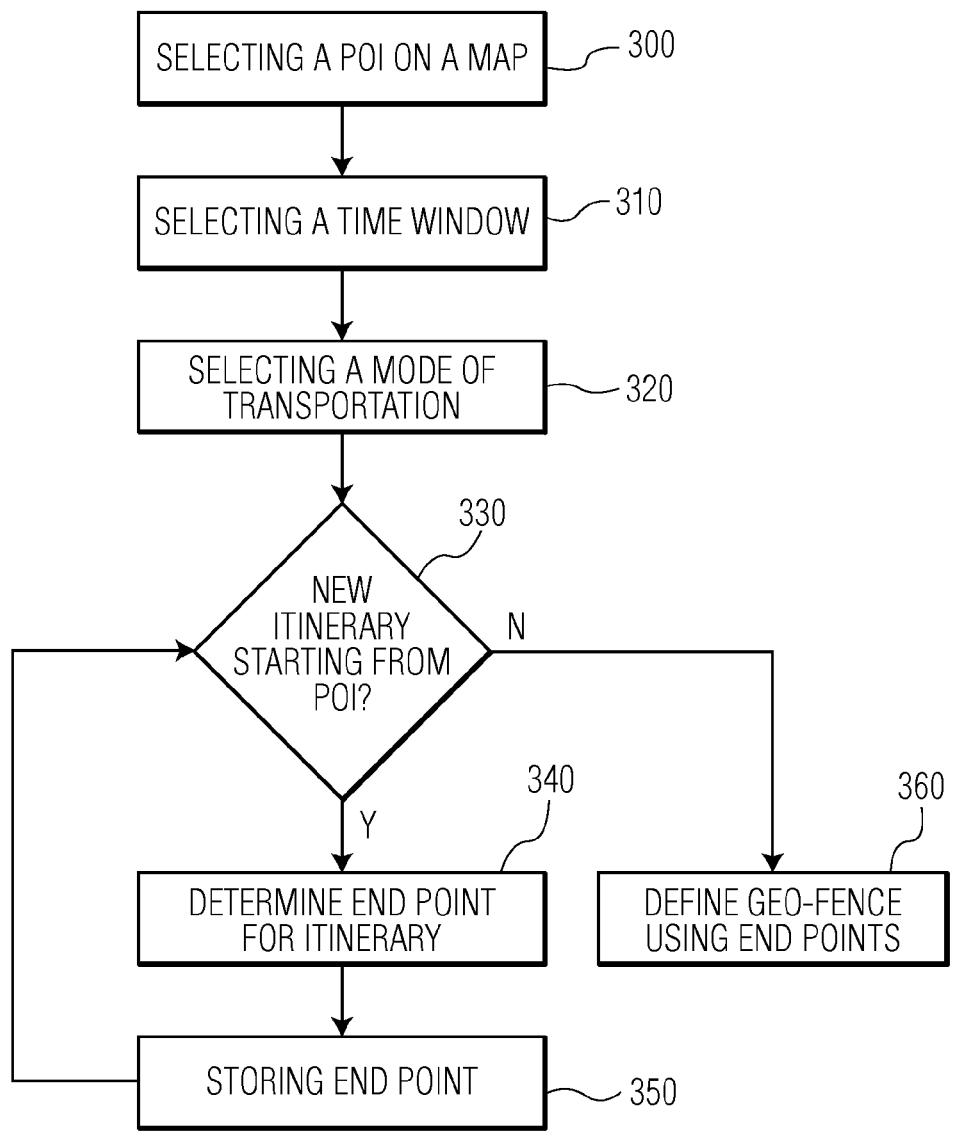
FIG. 3A shows a sequence diagram of an exemplary geo-fence creation in accordance with an embodiment of the present system.

FIG. 3A is an illustration of the geo-fence creation according to another embodiment of the present system. The here after described method is carried out by the content server 210, more specifically the spatial engine 240. In a preliminary act 300 of the present method, a POI is selected. This may be for instance a new POI created after the content ingestor 250 discovered a new POI from the different content sources 260 it is connected to.

In a further act 310, a time window or time interval is provided. The time window allows to define the time allocated to reach the boundary of the geo-fence. Any point inside the perimeter of the geo-fence, provided it is accessible using a chosen mode of transportation, can be reach within the or less then the time window using that chosen mode of transportation (selected in an additional act 320). As seen later on in FIG. 3B, the mode of transportation may be chosen from predefined modes of transportation, the choice being based for instance on measurements of velocity of a user equipment. Alternatively, the mode of transportation may be a preset mode of transportation so that geo-fences may be built for various time intervals and modes of transportation.

In a further act 330, the spatial engine 240 will explore the possible routes or itineraries starting from the POI, moving for instance a virtual point along these routes. As the POI can be placed on a map, the spatial engine 240 can actually look clockwise or counter clockwise at all the itineraries starting from the POI using the chosen mode of transportation. Existing technologies for LBS such as Google!Maps™ allows today to discover the different itineraries starting from a POI on a map. For each discovered route or itinerary (answer Yes to act 330 if there is still an itinerary to explore), the spatial engine 240 will determine in a further act 340 the (outermost) end point that can be reached on the current itinerary using the determined mode of transportation. Average speed per mode of transportation may be stored in the location database (from the content sources 260) for each portion of road of the available maps. Knowing the different average speed for each portion of an itinerary, spatial engine 240 will travel along the current itinerary at the average speeds until the time window expires, the last visited point being selected as the end point for this itinerary.

In other words, the end point corresponds to how far the UE can travel on an itinerary considering the average speeds on the itinerary roads for the selected mode of transportation.

Each determined end point will be further stored in an act 350, and provided there is no more itinerary to explore (No to act 330), the spatial engine 240 will form the geo-fence for the present system using the stored end points in act 360, and store it in the location database, in association with the POI, the time window and the mode of transportation.

Figure 4:
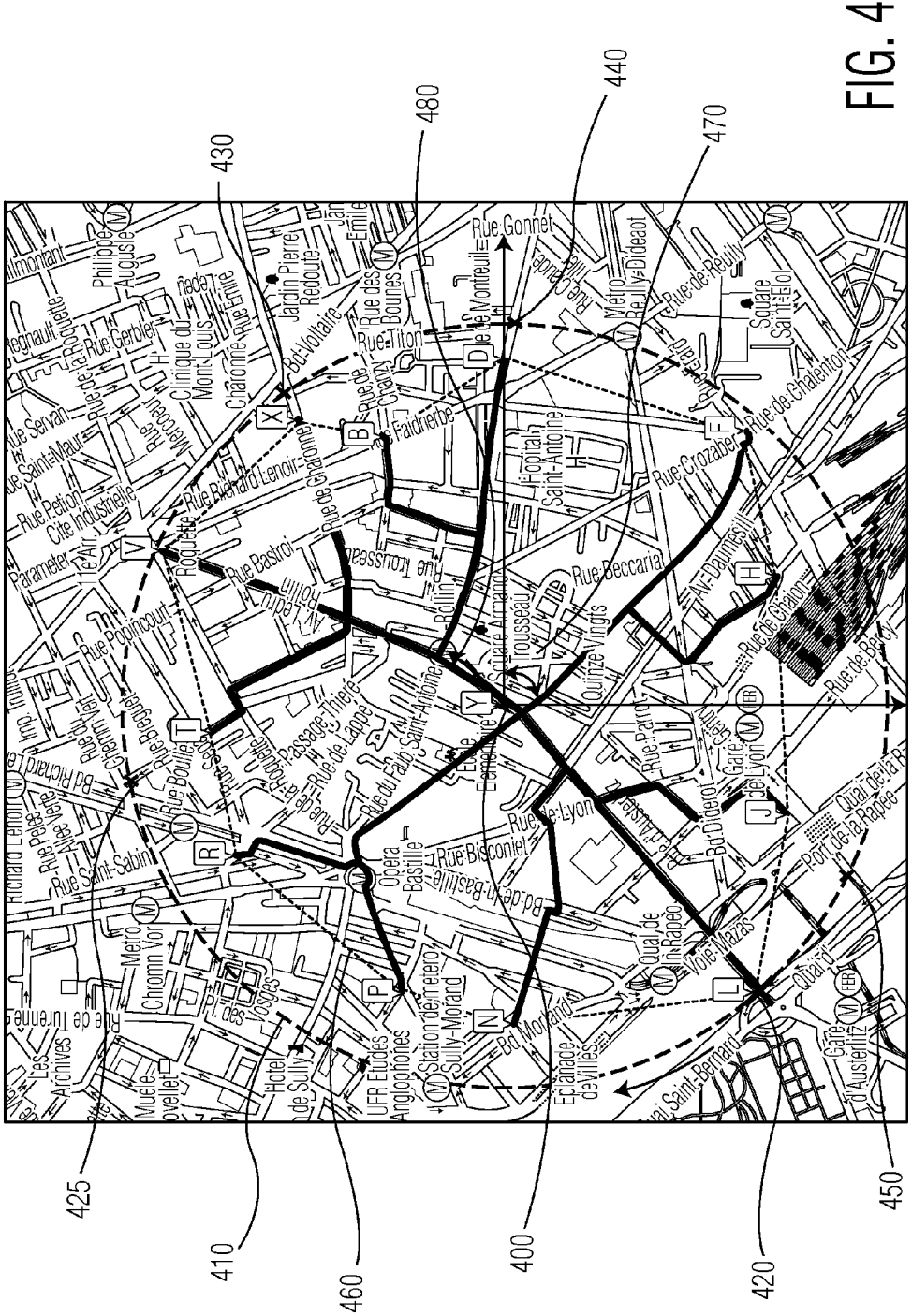
FIG. 4 shows an exemplary illustration of a polygonal geo-fence in accordance with an embodiment of the present system.

An itinerary in the present system is considered as formed with one or more terrestrial routes. Various techniques are readily available to the man skilled in the art to determine the itineraries starting from a POI. The spatial engine 240 may be arranged for instance to explore one direction starting from a given POI 400 as illustrated in FIG. 4, and explore a road until the next intersection, provided the time window has not expired. Each time the spatial engine 240 runs into an intersection, it will elect one direction, mark the others as non explored yet and associate each of them with the time left from the initial window time, and carry on the road as long as the time window is not expired, using the average speed for the mode of transportation under consideration. When the time window has expired, it will store the end point, and resume the process from the closest intersection with roads marked as unexplored. For all intersections, including the starting POI that could be seen as an intersection, it could explore direction clockwise or counter clockwise to make sure no road is missed.

Another embodiment of the geo-fence construction for the present system is illustrated in FIG. 4. Once the POI 400 is chosen, for instance an address in the 12$^{th}$ district of Paris, the system will select a time window, say 12 minutes for instance, and a mode of transportation, here "pedestrian". For simplification purposes, let's assume that the average speed for a male pedestrian is 4.5 km/h, for all streets of the neighborhood, as it is assumed flat. Additional time constrains, such as read lights, crosswalks . . . , may be taken into account. Yet we will assume that the average speed already reflects such constrains for additional simplification purposes.

Considering the mode of transportation, the maximum distance coverage within 12 minutes would be 900 m. In order to generate the geo-fence for the present system, the construction may be initiated with constructing a circular geo-fence as know today, i.e. a geo-fence with a 900 m radius from the POI 400. The known geo-fence is illustrated with a circle 410 centered on the POI 400 in FIG. 4. As explained before, such known geo-fences do no reflect actual time of transportation due to the complexity of the streets mesh in the illustration of FIG. 4.

One way of defining the borders of the geo-fence of the present system would be to look at all the points when the known geo-fence 410 crosses a street, like edge points 420, 425, 430, 440 and 450. More points are of course available but only a limited number is considered here for clarity. Exploring these points for instance clockwise, and using a known mapping tool such as Google!Maps™, the spatial engine 240 can determine itineraries from POI 400 to any of these edge points. The edge points define the destination point for the calculation of an itinerary starting from the POI 400. As each of these calculated itineraries between the POI 440 and any selected edge point may not follow a straight road, an end point that can be reached:

within the time window, here 12 minutes, at the average speed of the chosen mode of transportation, here 4.5 km/h for a pedestrian, may well fall within the circle geo-fence 410. This is the case for instance for:

point T that is the end point between the POI 400 and the edge point 425, point X that is the end point between the POI 400 and the edge point 430, point D that is the end point between the POI 400 and the edge point 440, point J that is the end point between the POI 400 and the edge point 450, End point L substantially coincides with edge point 420 as the itinerary is almost a straight line that can be mixed with a radius for the circular geo-fence 410.

Using this technique, the spatial engine 240 may explore each itinerary (this corresponds to act 330 of FIG. 3A) clockwise and determine end points B, D, F, H, J, L, N, P, R, T, V and X (as in act 340 of FIG. 3A). Further storage, as in act 350 of FIG. 3A, will enable the definition of the present geo-fence. Indeed by joining these end points, a geo-fence with the polygon shape 460 may be formed for the present system, as in act 360 of FIG. 3A.

Depending on the desired precision for the polygonal geo-fence, more or less edge points on the circle geo-fence 410 may be selected using some filtering criterion. Due to the complexity of roads and streets, a given number per circle arc may not be warranted. Therefore, a filtering criterion, like maximum number of edge points per quarter circle (pointer 470 as illustrated in FIG. 4) may be more practical to implement.

Provided faster streets are available in the vicinity of the POI 400, it may be practical for the selected mode of transportation to use an entry value, like the average speed for the streets matching the POI location to define the initial circular geo-fence radius. If the time to travel from the POI to the edge point is shorter than the time window, the radius of the circle geo-fence 410 may be increased (by a given ratio for instance) in that direction to define a new edge point. If an end point cannot be found on the new itinerary from the POI to the new edge point, another increase in radius is not needed. This may happen for instance if the selected mode of transportation is "car" and the edge point falls on a highway while any place else the edge points fall on city streets where the average speed is significantly reduced. This highway portion will significantly accelerate the movement of the virtual point so that it may reach the edge point before the time interval lapses.

Figure 3B:
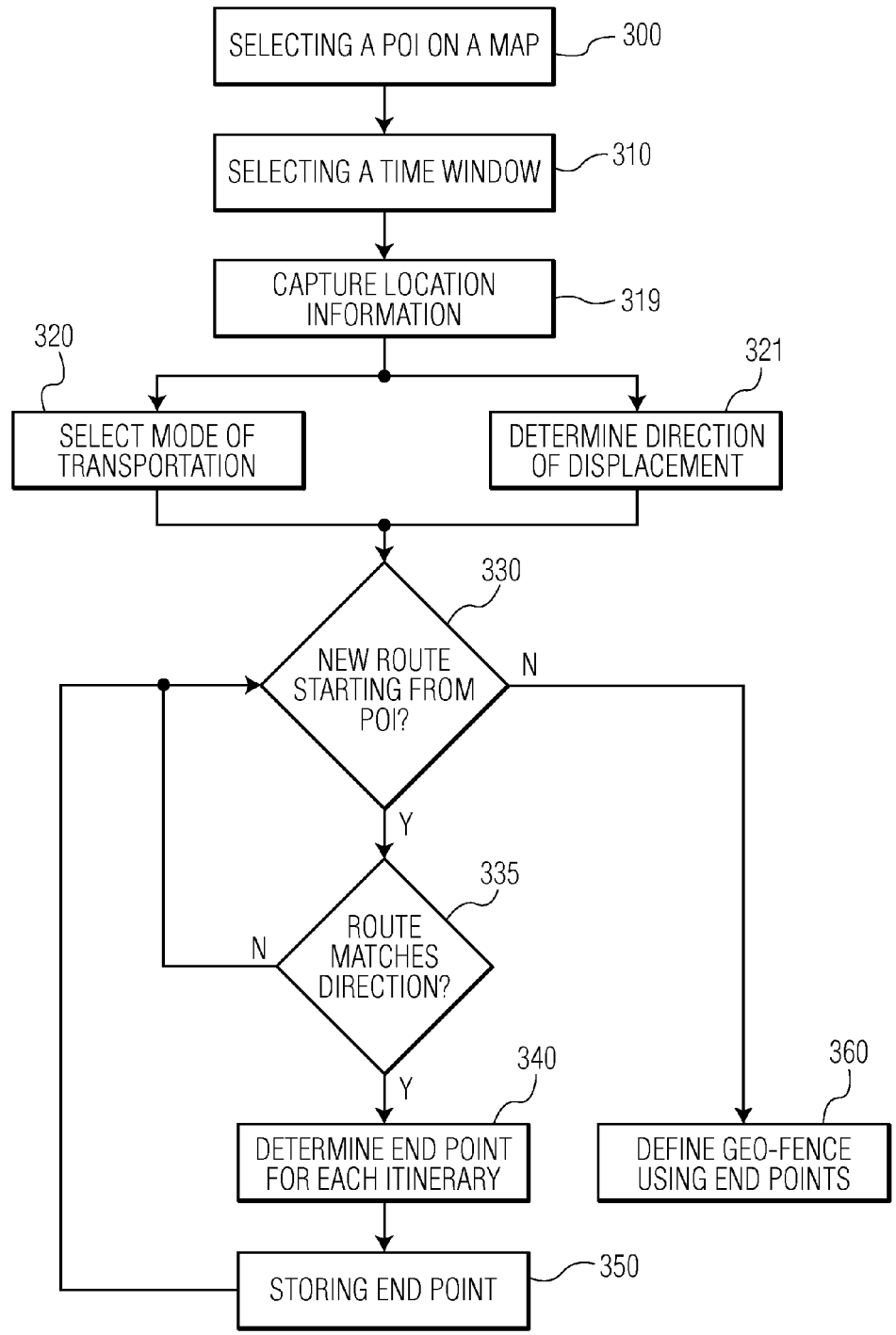
FIG. 3B shows a sequence diagram of another exemplary geo-fence creation in accordance with an embodiment of the present system.

An alternative embodiment of the present system is presented in FIG. 3B. The construction of a polygonal geo-fence illustrated in FIG. 3A or FIG. 4 may be applied to an actual moving object such as MS 200. Indeed, as illustrated in FIG. 3B (wherein the same acts bear the same numbers as in FIG. 3A), the choice of a mode of transportation in act 320 may result from the capture of location information in a preliminary act 319. Location information may comprise, as illustrated before, location coordinates as captured over time using a GPS enabled MS 200, and may also comprise gyroscope and other positioning sensors. Sensing the position information will enable the MS 200 or location server 210 to infer the MS user's mode of transportation. Known techniques are readily available to the man skilled in the art to infer an activity based on sensors. It is beyond the teaching of the present system to detail how the mode of transportation may be inferred. A simple measurement of the current speed (distance measured over a period of time using GPS sensor divided by that period of time) or velocity may for instance help to define the range of—or average—speed the MS is travelling at. As each range of (or average) speed may be associated with the spatial engine 240 to a mode of transportation, the present mode of transportation of the UE may be determined. For instance:

pedestrian, speed [3-5 km/h]
jogger, speed [8-15 km/h]
car, speed [40-100 km/h]
motorcycle, speed [40-100 km/h]

Other sensors may be used (gyroscope for instance) to distinguish a car from a motorcycle, a bicycle from a jogger.

Along the determination of the mode of transportation in act 320, the MS or the location server may determine the direction of travel of the MS in a further act 321. This may be calculated for instance from the periodic or random measurements of the MS location and/or by storing the history of travel of the MS 200. The direction may be qualified for instance using cardinal points (UE travelling south east) or using a more precise vector.

Knowing the MS direction, the spatial engine 240 of the location server 210 may discard any itinerary (looked up in act 330) that does not match this direction (No to act 335) based on a confidence test. The confidence test for an itinerary under review may measure how much of a change of direction would be necessary to embark on this itinerary. For instance an itinerary that includes an immediate U turn will be discarded. Alternatively, an itinerary that includes a U turn only to head rapidly in a transverse direction may be kept. An itinerary that includes going back to where the MS is coming from will be completely discarded (using the history of travel from the MS). Provided there is a match with the direction of travel (Yes to act 335), the itinerary under review is kept and the present method will resume with act 340 as in FIG. 3A.

Using the example of FIG. 4, let's assume that the MS reports a speed of 4-5 km, with no rocking motion. The spatial engine 240 will infer an activity "on foot". The user of the MS 200 is inferred as a pedestrian and the data for the local streets in Paris 12$^{th}$ are uploaded for "pedestrian average speeds". The recent location activity shows a direction of motion or travel as in arrow 480, i.e. heading North East. Then only the itinerary leading to end points T, V, X, B and D will be used for the definition of the polygonal geo-fence. Itineraries heading to end points J, L and N (i.e. south) are discarded as they would need a U turn and a redirection to where the user came from. Itineraries heading to end points P, R, H and F may be kept (itineraries heading sideways), depending on the controls associated to act 335 (matching of the direction with a more or less loose confidence test). As they include a U turn to immediately travel in a transverse South East or North West direction, they could be kept as relevant itineraries that match the MS direction inferred in act 321.

The proposed polygonal geo-fences of the present system may be used by the recommendation engine 230 of FIG. 2 to find candidates POI(s) to present to the UE 200 in response to the provided intent.

Figure 5A:
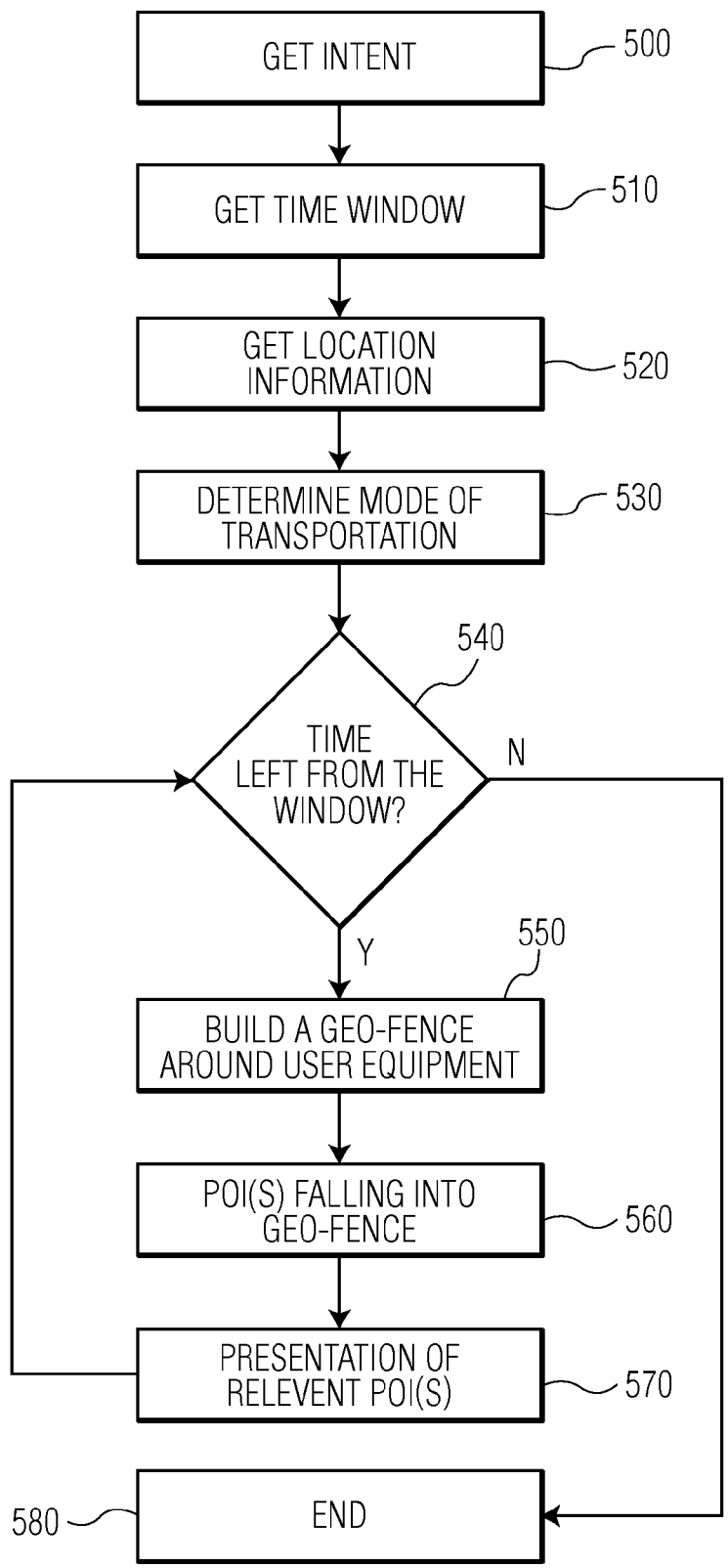
FIG. 5A shows a sequence diagram of an exemplary selection of relevant POI(s) in accordance with an embodiment of the present system; and, FIG. 5B shows a sequence diagram of another exemplary selection of relevant POI(s) in accordance with an embodiment of the present system.
Figure 5B:
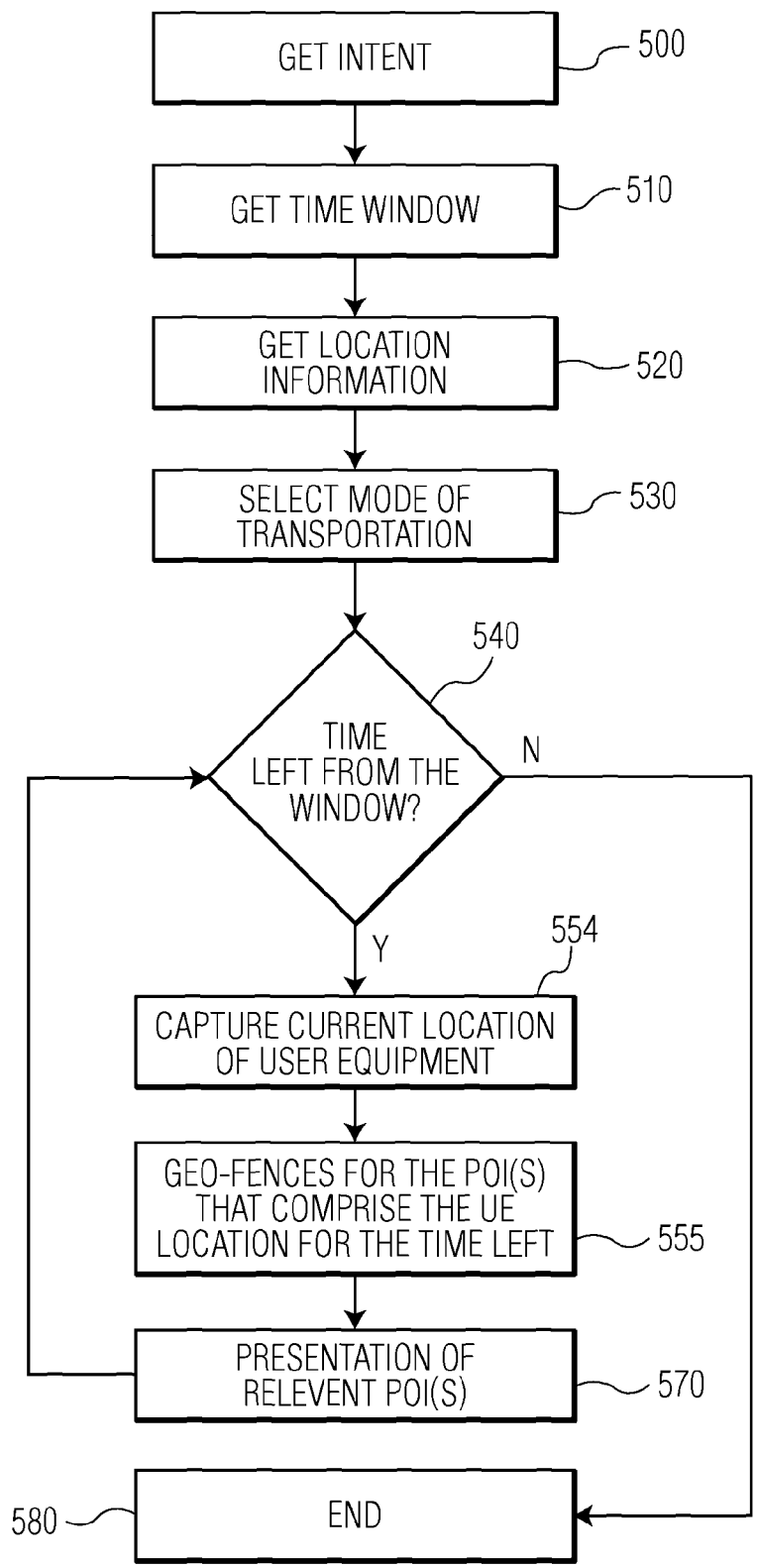

FIGS. 5A and 5B are illustrations of exemplary embodiments of the present recommendation system. Unless mentioned otherwise, the same reference numbers corresponds to the same acts in both figures. FIG. 5A corresponds to a first embodiment of the present location service, using a user centric approach as detailed here after. FIG. 5B corresponds to a second and alternative embodiment of the present location service using a POI centric approach. The user centric approach will be detailed first. Both embodiments are carried out by the recommendation engine 230 of the location server 210, unless mentioned otherwise.

In an act 500, an intent is gathered/received from the user of the UE 200. The intent may be processed as mentioned before by the intent analyzer 220.

In a further act 510, a time window is gathered. The time window may be provided through user input. Alternatively, if no time window is provided, a default time window, as mentioned before, may be inferred from the provided intent (default time window for each identifiable category of intent). In an additional act 520, location information is collected from the MS 200. A mode of transportation will be subsequently calculated by the spatial engine 240 in act 530 using the location information. The mode of transportation helps determine ranges of speeds for travelling to POIs, and hence influences the POIs that are considered within reach of the UE in the present system.

In a further act 540, a loop will be started for the duration of the time window. Provided there is time left from the time window (answer Y to act 540), the recommendation engine will carry on with querying the location database of POIs) to retrieve candidate POIs that match the user intent and are located within reach of the user equipment based on the time left of the time window and the determined mode of transportation. The querying may be at regular interval or triggered through different events such as for instance amount of distance travelled by the UE, absence of reaction from the user to the proposed alerts after a preset amount of time . . . .

To do so, the recommendation engine may use known circular geo fences or the polygonal geo-fences taught in relation to FIGS. 3A and 3B, and additionally FIG. 4. Provided the polygonal geo-fences are used, in an additional act 550, the recommendation engine 230 will request the spatial engine 240 to built a polygonal geo-fence around the UE (hence the user-centric embodiment). To do so, the spatial engine 240 will determine the UE current location using an updated location information. Using this current location as the location of the object of interest as in FIGS. 3A and 3B, the spatial engine 240, more exactly its geo-fence creator 241, will:

determine terrestrial routes or itineraries starting from that current location;

for each determined terrestrial route, determine an end point that can be reach on the terrestrial route within the time left of the time window using the mode of transportation determined in act 530.

The built geo-fence is the perimeter around the UE current location formed with the end points (or a selection thereof). Any point within that geo-fence perimeter may be reached using the mode of transportation within the time left of the time window. This choice of polygonal geo-fences will ensure that all POIs that can be reached in less (or equal) time than the time left from the time window are to be reviewed by the recommendation engine 230.

In an additional embodiment of the present method, the spatial engine 240 may determine the direction of travel of user equipment using the location information. As explained in relation to FIG. 3B, some terrestrial routes may further be discarded provided they do not match the determined direction within a confidence test.

In another embodiment of the present method, the intent, as explained before, may comprise a location element as determined by the intent analyzer of the intent engine 220. The determination of the direction of travel may then be enhanced using both the location information and the location element. For instance, if the current direction as measured from the sole location information collected from the UE indicates a south east route, the direction may be corrected provided the user's input was "get lunch on my way to San Jose". The south east direction may be then corrected to just south.

In a further act 560, the spatial engine 240, more exactly it geo-fence manager 242, will select the candidate POI(s) that are located within reach of the UE as the POI(s) from the location database the location of which falls within the built geo-fence perimeter.

The different location inputs used in the present system may be seen as an augmented location. This augmented location is constructed by the spatial engine 240 and may comprise:
the current location, as inferred from the location enabled device,
the UE speed, as calculated from the successive UE locations,
the mode of transportation,
the direction of travel,
the possible destinations, based on the direction of travel and a location element provided with the intent, if any.

The selected POI(s) may be seen as depending upon this augmented location among other parameters.

In a further act 570, once the recommendation engine 230 has received the selected POI(s) from the spatial engine 240, it will determine the relevant final candidate POI(s), i.e. the ones that also match the intent, and optionally preset filtering criteria or filters. It is the matching engine (as seen in FIG. 2) of the recommendation engine 230 that is in charge of determining the final candidates POI(s). The matching may be performed using commonly known matching techniques. For instance, the matching may use a syntaxic or NLP approach to compare the intent request with metadata and/or tags (as defined by the geo tagger of the content ingestor 250) for each selected POIs presented by the spatial engine 240.

The term "alerts" refers to the POIs that are actually presented to the user, i.e. the final candidates. In an additional embodiment of the present system, the preset filters may comprise:
filtering based on the user profile. The user profile is something that the user typically sets once at registration with the location service, or very infrequently, upon accessing his user account. It can contain information that the user may be willing to share such as gender, age, home address, work address, alter preferences like frequency of alerts . . . . In addition to the explicit user profile, it is also possible that the user profile can be inferred either from the user's activity or from external data sources that the user may connect to his/her profile. For example, the system can offer the user to sign in to his Facebook account that can give the system more information about the user's social circle, interests, likes etc. Also, if the user were to provide the system with access to his/her Foursquare account, the system will have a record of all the "check-ins" from the user,
filtering based on historical data, i.e. intent trail of the user, past suggestion/acceptance sequences from the user, past location trails of the user . . . .

Once the final candidate POIs have been selected by the matching engine, the prioritization engine may be used in an optional embodiment to assign relevance scores to the final candidate POIs, based for instance on alert settings and history of acceptance of alters from the user for instance. Final candidate POIs, with or without a relevance score, will be presented to the alert dispatcher that will push these POIs to the user.

The present method will end in a further act 580, for instance when:
the user selects a POI, i.e. he responds to one POI alert,
the window time expires (answer No to act 540),
the user terminates the service.

FIG. 5B is an illustration of the POI centric embodiment. The same acts bear the same reference numbers. Acts 500 to 540 are actually identical to the same acts for the user centric embodiment of FIG. 5A.

As in FIG. 5A, a loop will be started in the act 540 of FIG. 5B for the duration of the time window. Provided there is time left from the time window (answer Y to act 540), the recommendation engine will carry on with querying the location database of POIs) to retrieve candidate POIs that match the user intent and are located within reach of the user equipment based on the time left of the time window and the determined mode of transportation.

To do so, the recommendation engine may use known circular geo-fences built around all POIs stored in the location database. Alternatively, it may use the polygonal geo-fences taught in relation to FIG. 3A and additionally FIG. 4.

In the POI centric embodiment, the spatial engine 240, more specifically the geo-fence creator 241, is in charge of creating polygonal geo-fences around each POI, for various time intervals and modes of transportation. Contrary to the user centric embodiment, the polygonal geo-fences are constructed prior to the actuation of the present location service, for instance after a new POI is ingested by the content ingestor engine 250, and pass it on to the spatial engine 240.

Hence the location database may be described as comprising a plurality of POI(s), each POI being associated for a preset number of time intervals and various modes of transportation to a geo-fence which perimeter is defined by end points that can be reached for a given mode of transportation within one of the time intervals on terrestrial routes starting from the POI.

In an additional act 554, the recommendation engine 230 will instruct the spatial engine 240 to get the UE current location using updated location information. In a further act 555, it will also query the spatial engine 240 to retrieve the POIs within reach of the current location of the UE. To do so the spatial engine 240 will select from the location database the polygonal geo-fences associated to:
the determined mode of transportation; and,
a time interval smaller or equal to the time left from the time window.

This choice of polygonal geo-fences will ensure that all POIs that can be reached in less (or equal) time than the time left from the time window are to be reviewed by the recommendation engine 230. Provided the itinerary of the UE crosses one of these selected geo-fences, the corresponding geo-fence is "triggered". In other words, the spatial engine 240 will present to the recommendation engine 230 all the triggered geo-fences, i.e. the selected geo-fences that comprise the UE current location as measured in act 554.

The present POI centric method will resume with act 570 (presentation of the final candidate POIs), similar to the user centric embodiment. The present method will end in act 580 for the same reasons exposed in relation to FIG. 5A, for instance when the time window expires (answer No to act 540).

In an additional embodiment of the present method, the triggering of the polygonal geo-fence may be based on more rules than the simple crossing of the UE itinerary. Additional rules such as the type of mode of transportation, the moment of the day may be used to discard some POI(s) based on these rules.

It may be interesting in an additional embodiment of the present system to partition the location database in different regions. The regions may be overlapping so as to cover as much ground as possible. A check of the UE initial position may help focus on one of the regions to limit the number of POIs reviewed by the spatial engine 240 when retrieving the candidate POI(s).

One may note that the user centric or POI centric embodiments are presented as separated embodiments. The present recommendation server may rely upon both embodiments and elect one upon applying a test for instance based on the user intent or the mode of transportation.

The present system has been illustrated as a client (UE)—server implementation. In an alternative embodiment of the present system, the UE may comprise the different engines illustrated for the recommendation server 210 and be self sufficient using a UE only implementation. The location database or additionally the spatial engine 240 may nonetheless be hosted on a distant server accessible over a data connection.

In the present system, the speed of the UE may be calculated at any time to check the direction of travel of the UE. It may also be used by the spatial engine 240 to check if the mode of transportation has not changed, or if a recent slow down is due to traffic conditions (comparing current location with latest traffic report) or if the user is actually getting out of the highway to drive to a proposed POI.

In a further embodiment of the present system, it may be of interest to render on the UE one or more geo-fences around a given POI. This will help the user determine an area of reach based on one or more time intervals, mode(s) of transportation. To do so, the user may be presented with a GUI comprising a map centered around a POI, and either through user inputs or predefined values, one or more time intervals, and mode(s) or transportations may be selected (through user inputs passed on to the server, preselected based on a location service settings, or a combination of both).

For each pair (time interval, mode of transportation), a geo-fence according to the present system will be determined by the location server, and subsequently rendered a GUI, either through the rendering of the geo-fences edges (joining the different determined end points and/or coloring the geo-fence interior surface.

One or more geo-fences for instance centered around a given POI, for a selected mode of transportation, may be displayed on a map GUI rendered on the user equipment for different time intervals. Thus, the user will see a series of concentric geo-fences, as the one shown in FIG. 4, joining in dotted lines the end points B to V. In a glance, the user will know how far he could travel e.g. on foot, riding a bike or using a bus around his current location is the POI is captured through a location enabled device.

According to an aspect of the present system there is disclosed a computer program stored on a computer readable non-transitory memory medium. The computer program is configured to associate an object of interest in a location database with a geo-fence when executed by a processor of a location server. The computer program includes instructions that when executed by the processor configure the location server to:
 a) select a first time interval;
 b) select a mode of transportation;
 c) determine terrestrial routes starting from the object of interest placed on a map;
 d) for each determined terrestrial route, determine an end point that can be reach on said terrestrial route within the first time interval using the selected mode of transportation; and
 e) store a geo-fence for the first time interval and mode of transportation in associating with the determined end points.

According to a further aspect of the present system there is disclosed a location server. The location server includes a processor and a computer readable non-transitory memory medium. A computer program is stored on the memory medium and comprises instructions that, when executed by the processor, cause the location server to implement a method of associating an object of interest in a location database with a geo-fence. The method includes:
 a) selecting a first time interval;
 b) selecting a mode of transportation;
 c) determining terrestrial routes starting from the object of interest placed on a map;
 d) for each determined terrestrial route, determine an end point that can be reach on said terrestrial route within the first time interval using the selected mode of transportation; and
 e) storing a geo-fence for the first time interval and mode of transportation in associating with the determined end points.

Similarly, the user equipment contains, in an exemplary embodiment, a processor, a non-transitory computer-readable memory medium and a computer program stored in the memory medium. The computer program includes instructions to configure the processor and implement the steps performed by the user equipment that are disclosed herein.

APPENDIX 1

Sample Intent Categories
 Tours
 Nature
 Adventure
 Historic
 Daily
 Food
 Restaurants
  By Cuisine
  By Food Type
   Bakeries
   Health food
  By Features
   Parking
   Ambience
   Outdoor Seating
   Business Hours
   Accepts Credit Cards
 Street Eats
 Food Fairs
 Coffee Snack Bars
Fast Food joints
Bakery
Deli
Pubs and Bars
Attractions
Art Galleries
Aquariums
Museums
Theatre
Zoo
Botanical Garden
Water Park
Restaurants
Beaches
Festivals
Marina
Night Life
Bars and Pubs
Dancing
Music
Comedy
Bowling alley
Sports Bar
Billiards/Pool/TT
Hotels
City Specific
Fitness
Health club
Yoga
Spa
Gym
Transit
Train station
Airport
Bus stop
Ferry Terminal
Events
Music
Performing Arts
Classes
Business
Family and Kids
Food
Social Events
Fund Raiser
Sports
Conference
Conventions
Things To Do
Bowling
Hiking
Golf Courses
Ice Skating
Swimming Pools
Zoos
Aquariums
Libraries
Museums
Parks
Movies
Services
Accounting
Automobiles
Moving
Repair
Shoes
Tax
Child Care
Chiropractors
Cleaning
Contractors
Laundromats
Home Improvement
Locksmith
Interior Designers
Dry Cleaners
Shopping
Antiques
Book Stores
Toy Stores
Computers and Office
Department Stores
Drug Stores
Eye Wear
Florists
Furniture
Jewelry
Jewelry
Mobile & Cellular
Shopping Malls
Photography
Shoes
Outlets
Clothing
Free WiFi Spots
Restrooms
Deals Although the present disclosure has been described with reference to one or more examples, workers skilled in the art will recognize that changes may be made in form and detail without departing from the scope of the disclosure and/or the appended claims.

What is claimed is:

1. A method to associate an object of interest in a location database with a geo-fence, said method comprising:
   a) selecting a first time interval;
   b) selecting a mode of transportation;
   c) determining terrestrial routes starting from the object of interest placed on a map;
   d) for each determined terrestrial route, determining an end point that can be reach on said terrestrial route within the first time interval using the selected mode of transportation; and
   e) storing in the location database a geo-fence for the object of interest in association with the first time interval, the mode of transportation and the determined end points.

2. The method of claim 1, wherein the object of interest is a location enabled user equipment, the act b) further comprising:
   b1) capturing location information from the user equipment;
   b2) determining the mode of transportation based on the captured location information.

3. The method claim of claim 2, the first time interval being a window time provided through the user equipment, the method further comprising for the duration of the time window:
   f) determining the user equipment current location using the location information; and
   g) repeating acts b1, c) to e) using the time left from the window time as the first time interval.

4. The method of claim 3, further comprising the act of:
   c1) determining a direction of travel for the user equipment based on the captured location information;
   the act d) further comprising the act:
   d1) discarding the terrestrial routes that do not match the determined direction within a confidence test.

5. The method of claim 1, wherein at least one of the object of interest, the first time interval and the mode of transportation is selected from a user equipment, the method further comprising after the act of storing a geo-fence determined according to acts c) and d) using the first interval, mode of transportation and object of interest, a further act of:
   f) rendering the geo-fence on a GUI of the user equipment.

6. A location server to associate an object of interest in a location database with a geo-fence, location server being configured to:
   a) select a first time interval;
   b) select a mode of transportation;
   c) determine terrestrial routes starting from the object of interest placed on a map;
   d) for each determined terrestrial route, determine an end point that can be reach on said terrestrial route within the first time interval using the selected mode of transportation; and
   e) store a geo-fence for the first time interval and mode of transportation in associating with the determined end points.

7. The location server of claim 6, wherein the object of interest is a location enabled user equipment, the server being further configured to:
   b1) capture location information from the user equipment; and
   b2) determine the mode of transportation based on the captured location information.

8. The location server of claim 7, the first time interval being a window time provided through the user equipment, the server being further configured to, for the duration of the time window:
   f) determine the user equipment current location using the location information; and
   g) repeat b1, c) to e) using the time left from the window time as the first time interval.

9. The location server of claim 8, further configured to:
   c1) determine a direction of travel for the user equipment based on the captured location information; and
   d1) discard the terrestrial routes that do not match the determined direction within a confidence test.

10. The location server of claim 6, wherein at least one of the object of interest, the first time interval and the mode of transportation is selected from a user equipment, the server being further arranged to:
    f) determine a geo-fence according to c) and d) using the first interval, mode of transportation and object of interest, a further act of:
    g) render the geo-fence on a GUI of the user equipment.

11. A computer readable non-transitory memory medium comprising a computer program stored thereon and being configured to associate an object of interest in a location database with a geo-fence, the computer program comprising instructions to:
    a) select a first time interval;
    b) select a mode of transportation;
    c) determine terrestrial routes starting from the object of interest placed on a map;
    d) for each determined terrestrial route, determine an end point that can be reach on said terrestrial route within the first time interval using the selected mode of transportation; and
    e) store a geo-fence for the first time interval and mode of transportation in associating with the determined end points.

12. The computer readable non-transitory memory medium of claim 11, wherein the object of interest is a location enabled user equipment, the computer program comprising further instructions to:
    b1) capture location information from the user equipment; and
    b2) determine the mode of transportation based on the captured location information.

13. The computer readable non-transitory memory medium of claim 12, the first time interval being a window time provided through the user equipment, the computer program comprising further instructions to:
    f) determine the user equipment current location using the location information; and
    g) repeat instructions b1, c) to e) using the time left from the window time as the first time interval.

14. The computer readable non-transitory memory medium of claim 13, the computer program comprising further instructions to:
    c1) determine a direction of travel for the user equipment based on the captured location information; and
    d1) discard the terrestrial routes that do not match the determined direction within a confidence test.

15. The computer readable non-transitory memory medium of claim 11, the computer program further comprising instructions to receive at least one of the object of interest, the first time interval and the mode of transportation from a user equipment, the computer program further comprising instructions to:
    f) determine a geo-fence according to c) and d) using the first interval, mode of transportation and object of interest, a further act of:
    g) render the geo-fence on a GUI of the user equipment.

16. A system comprising:
    a location database; and
    a location server to associate an object of interest in a location database with a geo-fence, location server being configured to:
    a) select a first time interval;
    b) select a mode of transportation;
    c) determine terrestrial routes starting from the object of interest placed on a map;
    d) for each determined terrestrial route, determine an end point that can be reach on said terrestrial route within the first time interval using the selected mode of transportation; and
    e) store a geo-fence for the first time interval and mode of transportation in associating with the determined end points.

17. The system of claim 13, further comprising:
    a location enabled user equipment for providing location information to the location server;
    the location server being further configured to:
    b1) capture the location information from the user equipment; and
    b2) determining the mode of transportation based on the captured location information.

* * * * *

UNITED STATES PATENT AND TRADEMARK OFFICE
CERTIFICATE OF CORRECTION

PATENT NO. : 8,924,147 B2  
APPLICATION NO. : 13/538277  
DATED : December 30, 2014  
INVENTOR(S) : Vellaikal et al.

Page 1 of 1

It is certified that error appears in the above-identified patent and that said Letters Patent is hereby corrected as shown below:

Title page, item (57) Abstract
Line 7, delete "reach" and insert --reached--.

In the Claims

Column 20:
Claim 1, line 47, delete "reach" and insert --reached--.

Column 21:
Claim 6, line 22, delete "reach" and insert --reached--.

Column 22:
Claim 6, line 2, delete "reach" and insert --reached--.

Claim 16, line 50, delete "reach" and insert --reached--.

Signed and Sealed this
Thirtieth Day of June, 2015

Michelle K. Lee
*Director of the United States Patent and Trademark Office*